Patented May 16, 1950

2,507,568

UNITED STATES PATENT OFFICE 2,507,568

TELOMERS OF MONOOLEFINS AND SATURATED HALOGENATED CARBOXYLIC ACIDS, ESTERS, AND ANHYDRIDES

William E. Hanford, Short Hills, N. J., and Robert M. Joyce, Jr., Holly Oak, Del., assignors to E. I. du Pont de Nemours & Company, Wilmington, Del., a corporation of Delaware No Drawing. Application December 18, 1947, Serial No. 792,603

10 Claims. (Cl. 260—408)

This invention relates to the reactions of polymerizable olefines and more particularly to the reaction of olefines with halogenated carboxylic acids and esters and anhydrides thereof.

In Hanford and Joyce U. S. Patent 2,440,800, issued on Serial No. 438,466, filed April 10, 1942, of which this application is a continuation-in-part and the disclosure of which is, by this reference, incorporated herein, the unusual type of reaction denoted telomerization, is discussed extensively. In this reaction, as applied to the present situation, a plurality of molecules of a polymerizable olefinic compound is reacted under polymerization conditions with one molecule of a compound denoted a telogen which appears, together with the plurality of molecules of the polymerizable compound, in the resulting telomer. The telogen has also been called a chain transfer agent since by its intermediacy the propagating polymer is terminated and a new polymer chain initiated and the reaction chain continued.

This invention has as an object the preparation of telomers from polymerizable aliphatic monoolefinic hydrocarbons and saturated halogenated carboxylic acid and esters and anhydrides thereof. Other objects will appear hereinafter.

These objects are accomplished by the present invention of products having in their composition the components of a plurality of molecules of a polymerizable monoolefinic aliphatic hydrocarbon and the components of one molecule of a saturated halogenated carboxylic acid or anhydride or ester thereof, said carboxylic compound containing halogen of the class consisting of chlorine, bromine, and iodine and the preparation of said products by exposing to polymerizing conditions a reaction mass comprising said hydrocarbon, said acid, anhydride or ester, and a telomerization or free radical type catalyst, i. e. an addition polymerization catalyst ineffective in the Friedel-Crafts reaction and particularly a peroxy polymerization catalyst. The term "saturated" in the specification and claims means that the compound so designated is free from aliphatic carbon-to-carbon unsaturation.

This novel reaction of the polymerizable aliphatic monoolefinic hydrocarbon, such as ethylene can be conducted under conditions similar to those used for the polymerization of the hydrocarbon; e. g., those described for the polymerization of ethylene in U. S. Patents 2,133,553, 2,388,225, 2,396,785, 2,395,327, and 2,396,677, all filed March 15, 1941. The inclusion in the reaction mixture of the telogen, however, so alters the course of the reaction that there are produced, instead of polyethylene, products differing from polyethylene in chemical composition and having a lower average molecular weight than the polyethylene formed in the absence of the telogen.

In carrying out the reaction of this invention using a typical aliphatic monoolefinic hydrocarbon, such as ethylene, with a typical saturated halogenated carboxylic acid, such as, for example, dichloroacetic acid, or an anhydride, such as, for example, dichloroacetic anhydride, or an ester, such as, for example, ethyl dichloroacetate, it is preferred to operate at superatmospheric pressure, and pressure apparatus must, accordingly, be employed when operating under the preferred conditions. The apparatus consists, in its essential parts, of a pressure reactor capable of being heated, and equipped with means of agitating the reactants, with an inlet line for admitting gaseous ethylene, a vent connected to a safety rupture disc, and a pressure gage. The liquid charge is placed in the reactor, consisting of telogen, water, and/or inert organic solvent, such as isooctane, benzene, cyclohexane, etc., and catalyst, which is preferably a diacyl peroxide or an alkali or ammonium persulfate and is generally employed in the amount of about 1/700 of a molecular equivalent, based on the quantity of telogen employed. The reactor is then closed, the contents are agitated by suitable means such as by stirring with an internal stirrer or by agitating the reactor, and ethylene under pressure is admitted. The amount of ethylene so employed is regulated so that the desired pressure will be achieved at reaction temperature, which is generally somewhere between 60° C. and 150° C. The preferred pressure range is between 20 and 1000 atmospheres, the exact pressure employed depending somewhat upon the reactants used and upon the average molecular weight of product desired.

When benzoyl peroxide is used as catalyst, the reaction usually sets in at about 60° C. to 100° C. as is indicated by a drop in pressure registered on the gage attached to the reactor. It is preferable, although not essential, to maintain the desired reaction pressure by admitting additional ethylene from a storage cylinder as the reaction proceeds. If insufficient agitation is employed, the reaction may be accompanied by a marked temperature rise in the reaction mixture. The use of insufficient diluent, e. g., water, in the reaction mixture may also occasion such a temperature rise. In the absence of a diluent, the reaction between ethylene and the halogenated carboxylic compound may proceed with explosive violence unless it is carefully controlled. To avoid this, it is preferred to employ at least one-sixth as much water as telogen, and, in many cases, to employ an equal weight of water, except in those cases where the telogen is water sensitive. Because of its high specific heat, water serves as an excellent heat dissipating medium. When water-sensitive telogens are employed, it is preferable to employ an inert organic diluent.

The end of the reaction is indicated by the cessation of ethylene absorption. When this point is reached, the reaction mixture is allowed to cool, removed from the reactor, and worked up to isolate the resulting products. As a general rule, the telogen is used in excess and a considerable proportion of it remains unreacted at the end of the reaction. If the telogen happens to be a water-immiscible liquid, the products are generally soluble in it and may be isolated by separating the water from the reaction mixture and evaporating the more volatile telogen from the less volatile products.

It must be emphasized that, in all cases, the products produced by this reaction are not a single molecular species, but are a mixture of structurally homologous compounds differing from one another by one or more units of the polymerizable hydrocarbon. The telomers, of course, are the compounds in which there are a plurality of units of the polymerizable hydrocarbon.

The low molecular weight constituents of such telomer mixtures can often be separated into pure organic compounds by fractional distillation. This process is applicable to all telomer mixtures which can be distilled without decomposition. The process is particularly simple because the various constituents of the mixture differ from each other by at least two carbon atoms, leading to fairly large differences in boiling points. Other methods for separating the products can also be used in many cases, e. g., fractional crystallization, sublimation, selective extraction, etc.

Some product mixtures are not readily amenable to separation into their component parts. For a great many applications, however, the product mixture can be employed per se, since it is a mixture of functionally identical compounds differing from one another only in the number of taxomons in the chain between the functional groups.

A very important feature of the process of the present invention when a single telogen and taxogen are used is that it produces a mixture of structurally homologous compounds. This means that the reaction mixture reacts essentially as a pure compound and can be employed as such for many purposes.

For a given carboxyl compound the average chain length of the product mixture depends on the relative concentration of olefine and carboxyl compound. Increasing the concentration of the olefine relative to that of the carboxyl compound, for example, by increasing the pressure of the olefine in the reaction mixture or by employing an inert diluent, increases the average molecular weight or chain length of the products.

The average chain length of the product mixture is also a function of the carboxylic compound employed. In some telomerizations, a portion of the product consists of the 1:1 addition product of the olefin and carboxylic compound. Such 1:1 addition products are not considered telomers.

In order that the process may be more fully understood, the following specific examples are given by way of illustration, but the invention is not limited thereto as will become more apparent hereinafter.

Whenever the term "parts" is used, it is intended to mean "parts by weight."

Example I

A silver-lined pressure reactor is charged with 125 parts of isooctane, 25 parts of ethyl dichloroacetate and 0.6 part of benzoyl peroxide. The reactor is placed in a reciprocating agitator, pressured with ethylene, and the temperature raised to 120° C., whereupon a reaction sets in characterized by rapid absorption of ethylene, the pressure of which falls but is maintained at 935–970 atmospheres ethylene pressure for the duration of the reaction by admitting ethylene from a high pressured storage cylinder, cessation of the ethylene absorption indicating the end of the reaction. The white precipitate in the reaction mixture is separated by filtration and is found to be a high molecular weight ethylene/ethyl dichloroacetate reaction product. The lower molecular weight product is isolated by evaporation of the isooctane.

Example II

A silver-lined pressure reactor is charged with 40 parts of dichloroacetic acid, 140 parts of dioxane, and 0.6 part of benzoyl peroxide. The process is initiated at 100° C. under 995 atmospheres ethylene pressure. The vigorous reaction which sets in is characterized by a temperature rise to 135° C. and rapid absorption of ethylene. After about an hour, the ethylene absorption has ceased and the reaction is stopped. The product is poured into 800 parts of water and the resulting precipitate is separated by filtration, washed with water, and dried over calcium chloride. It is dissolved in hot toluene, filtered, and the toluene removed by evaporation under diminished pressure. There is obtained a brown grease containing 11.6 per cent chlorine, corresponding to an average of 17.2 ethylene units plus the elements of one dichloroacetic acid unit. The product is soluble in 0.5 per cent aqueous potassium hydroxide to give a surface-active solution.

The process of the present invention can be carried out with any polymerizable aliphatic monoolefinic hydrocarbon. The preferred members of this class are those having from 2 to 4 carbon atoms, e. g., ethylene, propylene, and isobutylene, ethylene being especially preferred. It is preferred that the ethylenic unsaturation be at the end of the compound and preferably in the form of a vinyl group

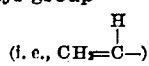

(i. e., $CH_2=\overset{H}{\underset{|}{C}}-$)

The telogens with which this invention is concerned are saturated halogenated carboxylic acids and their esters and anhydrides. Specific examples of carboxylic compounds useful in this invention are

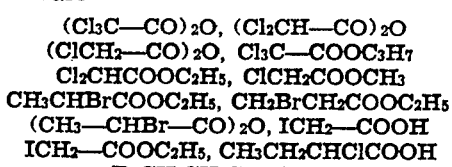

$(Cl_3C-CO)_2O$, $(Cl_2CH-CO)_2O$
$(ClCH_2-CO)_2O$, $Cl_3C-COOC_3H_7$
$Cl_2CHCOOC_2H_5$, $ClCH_2COOCH_3$
$CH_3CHBrCOOC_2H_5$, $CH_2BrCH_2COOC_2H_5$
$(CH_3-CHBr-CO)_2O$, $ICH_2-COOH$
$ICH_2-COOC_2H_5$, $CH_3CH_2CHClCOOH$
$BrCH_2CH_2CH_2COOH$

Particularly preferred are the halogenated lower (2 to 4 carbons) alkanoic acids having halogen of the class consisting of chlorine, bromine and iodine and their lower (1 to 3 carbons) alkyl esters.

It is not intended that the invention be limited in scope to telomerizations involving only polymerizable aliphatic monoolefinic hydrocarbons. For example, it is known that ethylene can be interpolymerized with a wide variety of unsaturated compounds. Among such, there may be mentioned propylene, isobutylene, styrene, and similar monoolefinic hydrocarbons; vinyl esters, such as vinyl acetate, vinyl formate, and vinyl isobutyrate; and such acids as acrylic, methacrylic, itaconic, citraconic, crotonic, maleic, and fumaric, as well as their derivatives, such as esters, acid halides, and anhydrides. Other compounds which can be interpolymerized with ethylene include vinyl chloride, vinyl fluoride, tetrafluoroethylene, vinylidene chloride, vinyl cyanide, N-vinyl imides, vinyl ethers, divinyl formal, divinyl butyral, methyl vinyl ketone, and butadiene. Just as the polymerization reaction is applicable to the interpolymerization of polymerizable aliphatic monoolefinic hydrocarbons such as ethylene with other unsaturated compounds, so also is the telomerization reaction applicable to mixtures of polymerizable aliphatic monoolefinic hydrocarbons with other unsaturated compounds, such as those mentioned above, as taxogens. When more than one taxogen is used in the telomerization, the reaction is referred to as "intertelomerization."

While a mixture of telogens can be used in a telomerization reaction, this is generally undesirable because it gives a mixture of products which do not all belong to the same homologous series.

The catalysts used in the process of this invention are free radical type polymerization catalysts, which are effective as catalysts for the polymerization of ethylene or its homologs and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalyst, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of ethylene type compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as acetyl peroxide, propionyl peroxide, benzoyl peroxide, and lauroyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen; such metal alkyls as tetraethyllead and tetraphenyllead; ultraviolet light, especially in the presence of such photosensitizers as mercury, alkyl iodides, benzoin, and acetone; amine oxides, e. g., trimethylamine oxide, triethylamine oxide, and dimethylaniline oxide; dibenzoylhydrazine; hydrazine salts such as hydrazine dihydrochloride and hydrazine sebacate; and hexachloroethane. While these catalysts vary in their activity they are regarded for the purpose of this application as the equivalents of the peroxy polymerization catalysts even though in general the latter are greatly preferred. The catalyst is used in amounts varying from about 0.0001 to 1.0 per cent by weight of the telogen, the preferred range in the case of the peroxygen catalysts being 0.05 to 0.5 per cent.

Of this group of catalysts, it is preferred to use peroxygen compounds, especially the diacyl peroxides and the alkali and ammonium persulfates. The other member of the preferred group of catalysts is molecular oxygen, which may be considered a special case of this group. It should be emphasized, however, that, to be effective as a catalyst, molecular oxygen should be present in small quantity, such as, for example, less than 1000 parts per million. As is generally the case in peroxygen catalyzed vinyl polymerizations, oxygen in larger quantities than this has a deleterious effect upon the reaction.

The process of this invention can be carried out over a wide range of temperatures, from room temperature to over 250° C. In fact, the upper temperature limit for the process of this invention is determined only by the thermal stability of the various compounds in the reacting system. The preferred temperature for any given process of this invention depends primarily on the catalyst and the telogen being employed. For the majority of cases, the preferred reaction temperature lies somewhere in the range of 60–150° C. The preferred catalysts, such as the diacyl peroxides and the persulfates, are generally employed in this temperature range, and the preferred classes of telogens react satisfactorily under such conditions. High temperatures are generally employed only with less active saturated halogenated carboxylic acids, their anhydrides and their esters which are more heat stable than those of the preferred class. Processes with less active anhydrides, acids and esters sometimes require temperatures of the order of 150–250° C.

Superatmospheric pressure is generally desirable for the process of the present invention. This is particularly true in the present invention since, in the preferred embodiments, the olefine is a gas, and it is essential to maintain superatmospheric pressure in order to achieve an appreciable concentration of the olefine in the system. This is not absolutely essential, however, and reactions of the present invention can be carried out at atmospheric pressure. On the other hand, successful reactions can be run as high as 2000 atmospheres pressure, and the ultimate pressure limit for the reaction is only that which the equipment available will stand. The preferred pressure range for the majority of reactions of the present invention is 20–1000 atmospheres.

The ratio of carboxylic acid or anhydride or ester thereof to olefine used in the process of this invention can be varied widely. In general increasing the ratio of carboxylic compound to olefine decreases the average molecular weight of the product. The preferred molecular ratio of carboxylic compound to olefine will depend upon the nature of the reactants and the chain length of the product desired, but will generally be in the range of 10:1 to 1:10. It must be emphasized that, especially in the case of ethylene, which is a gas, the average chain length of the product, i. e., the number of ethylene units, is a function of the concentration of ethylene which is maintained in the reaction system, and that this is, in turn, dependent on the reaction pressure. Moreover, the average chain length of the product in a given reaction also depends on the nature of the carboxylic compound employed, some of these being more active than others. In the final analysis, then, the reaction pressure employed for a given system will depend upon the chain length of product desired and upon the particular carboxylic compound used.

The reaction can be carried out with only the reactants and the catalyst present in the reaction zone. Since the reaction is exothermic and, under some conditions, proceeds with explosive violence, it is desirable, in most cases, to have present an inert diluent which will act to decrease the violence of the reaction and absorb some of the heat. The inert diluent can be a gas such as nitrogen, but, in general, a liquid diluent is used. In many instances, water is a suitable and satisfactory diluent. This is especially true where the olefine is gaseous under conditions of the reaction and the carboxylic compound is stable towards water. Inert organic solvents can be used either in place of the water or in addition to the water. It is clear that when the process is carried out in the absence of diluents, the process of this invention in some respects, is similar to massive polymerization. When an inert solvent is used, the conditions are somewhat similar to so-called solution polymerization.

It has been demonstrated that a solvent such as isooctane, serves the same purpose as increased pressure in increasing the average chain length of a given product for a given reaction system when the olefine is a gas which is used to maintain the reaction pressure; that is, when one of the reactants is a gas, such as ethylene, it is possible, by the use of a solvent for ethylene, to increase the relative concentration of ethylene with respect to carboxylic compound and thereby to effect the same result as is brought about by an increase in pressure. As suitable solvents, it is preferred to use relatively low-boiling liquids which are relatively inert under the reaction conditions and which necessarily do not fall in the classification of carboxylic compounds. Among such materials, there may be mentioned aliphatic hydrocarbons, cycloaliphatic hydrocarbons, aliphatic ethers, and cycloaliphatic ethers such as dioxane. Less desirable, although operable, are aromatic hydrocarbons.

The process can also be carried out under conditions similar to emulsion polymerization. Thus, when water is used as an inert diluent, there can be present also a surface-active agent which will aid in dispersing the reactants in the aqueous system. The reactants can be so dispersed regardless of their phase (gaseous, liquid, or solid). Suitable emulsifying agents are disclosed in Hanford and Joyce U. S. Patent 2,440,800 (Serial No. 438,466).

Although, as has been mentioned above, oxygen in small concentrations can, in the absence of other agents, act as a catalyst for the reaction, its presence in larger quantities is to be scrupulously avoided. This is in agreement with the now generally accepted fact that, in any peroxygen catalyzed vinyl polymerization, oxygen in appreciable quantities has a deleterious effect, not only upon yield, but, in many cases, upon the quality of the product produced. Likewise, in reactions of the present invention, it is preferred to reduce the oxygen content of the reaction system to a practical minimum.

The reaction can be carried out in any kind of pressure equipment made of, or lined with, material capable of withstanding moderate corrosive attack. Such lining materials as stainless steel, silver, nickel, and aluminum, have been found to be particularly useful, although chrom-vanadium steel can be used. Many other corrosion resistant alloys are, of course, applicable.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly. In such instances, portionwise or slow-continuous addition of the catalyst to the system facilitates the control of the reaction and generally leads to higher yields.

The reaction can be carried out as disclosed, in the above Hanford and Joyce patent, in a continuous system.

The products may be used as wax substitutes, as surface-active agents and as intermediates in chemical syntheses.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of reaction products having in the molecules thereof the components of a plurality of molecules of a polymerizable monoolefinic aliphatic hydrocarbon of two to four carbons and the components of one molecule of a halogenated compound of the class consisting of saturated halogenated lower aliphatic acids containing halogen of the class consisting of chlorine, bromine and iodine and anhydrides and lower alkyl esters thereof which comprises subjecting a reaction mass comprising said hydrocarbon and said halogenated compound at a temperature between 60° C. and 150° C. and at superatmospheric pressure to the action of a peroxy polymerization catalyst and isolating the products having in the molecules thereof the component of a plurality of molecules of the olefin and the components of one molecule of the halogenated compound.

2. Process of claim 1 wherein the hydrocarbon is ethylene.

3. Process for the preparation of reaction products having in the molecules thereof the components of a plurality of molecules of a polymerizable monoolefinic aliphatic hydrocarbon of two to four carbons and the components of one molecule of a saturated halogenated alkanoic acid of 2 to 4 carbons containing halogen of the class consisting of chlorine, bromine and iodine which comprises subjecting a reaction mass comprising said hydrocarbon and said halogenated compound at a temperature between 60° C. and 150° C. and at superatmospheric pressure to the action of a peroxy polymerization catalyst and isolating the products having in the molecules thereof the component of a plurality of molecules of the olefin and the components of one molecule of the halogenated compound.

4. Process of claim 3 wherein the hydrocarbon is ethylene.

5. A product having in the molecule thereof the components of a plurality of molecules of a polymerizable monoolefinic aliphatic hydrocarbon of two to four carbons and the components of one molecule of a member of the class consisting of saturated halogenated lower aliphatic acids containing halogen of the class consisting of chlorine, bromine and iodine and anhydrides and lower alkyl esters thereof, said product being obtained by the process of claim 1.

6. Process of claim 1 wherein the halogenated compound is a chlorinated acetic acid.

7. Process of claim 1 wherein the halogenated compound is dichloroacetic acid.

8. Process of claim 1 wherein the halogenated compound is a lower alkyl ester of a chlorinated acetic acid.

9. Process of claim 1 wherein the halogenated compound is a lower alkyl dichloroacetate.

10. Process of claim 1 wherein the halogenated compound is ethyl dichloroacetate.

WILLIAM E. HANFORD.
ROBERT M. JOYCE, JR.

REFERENCES CITED

The following references are of record in the file of this patent:

UNITED STATES PATENTS

| Number | Name | Date |
| --- | --- | --- |
| 2,093,695 | Larson | Sept. 21, 1937 |
| 2,138,917 | Grun | Dec. 6, 1938 |
| 2,198,046 | Vierling | Apr. 23, 1940 |